US012680934B2

(12) United States Patent
Ishikawa et al.

(10) Patent No.: US 12,680,934 B2
(45) Date of Patent: Jul. 14, 2026

(54) VISCOMETER DEVICE

(71) Applicant: Toki Sangyo Co., Ltd, Tokyo (JP)

(72) Inventors: Takahisa Ishikawa, Tokyo (JP); Naoto Yamada, Tokyo (JP); Masahiro Kimura, Tokyo (JP)

(73) Assignee: Toki Sangyo Co., Ltd, Tokyo (JP)

( * ) Notice: Subject to any disclaimer, the term of this patent is extended or adjusted under 35 U.S.C. 154(b) by 192 days.

(21) Appl. No.: 18/451,049

(22) Filed: Aug. 16, 2023

(65) Prior Publication Data

US 2024/0068920 A1 Feb. 29, 2024

(30) Foreign Application Priority Data

Aug. 25, 2022 (JP) ................................. 2022-133989

(51) Int. Cl.
*G01N 11/14* (2006.01)
(52) U.S. Cl.
CPC .................................... *G01N 11/14* (2013.01)
(58) Field of Classification Search
CPC ...................................................... G01N 11/14
See application file for complete search history.

(56) References Cited

U.S. PATENT DOCUMENTS 1,236,706 A * 8/1917 Grosvenor ............. G01N 11/14
192/58.4
4,241,601 A * 12/1980 Pennington, Sr. ..... G01N 25/04
73/54.28

6,588,254 B1 * 7/2003 Foster .................... G01N 11/14
73/54.38
2010/0011841 A1 * 1/2010 Mogawer .............. G01N 11/14
404/92
2010/0228504 A1 9/2010 Takahashi

FOREIGN PATENT DOCUMENTS

| JP | H0226053 Y2 * | 7/1990 |
| JP | H10160660 A | 6/1998 |
| JP | 2007-232539 A | 9/2007 |

OTHER PUBLICATIONS

English translation of JP-H0226053-Y2, accessed from patents. google.com.*
The Notice of Reasons for Refusal of the corresponding JP application No. 2022-133989 mailed Jun. 2, 2026 and Machine English translation thereof.

* cited by examiner

*Primary Examiner* — Kristina M Deherrera
*Assistant Examiner* — Jean F Morello
(74) *Attorney, Agent, or Firm* — Muncy, Geissler, Olds & Lowe, P.C.

(57) ABSTRACT

A rotary viscometer device including a rotor and a sample cup includes: a viscometer including the rotor and a closure portion having a larger diameter than the rotor; and a temperature control portion separate from the viscometer, wherein the sample cup is provided at the temperature control portion, and the sample cup is positioned with respect to the closure portion by inserting a vertically movable guide pin of the viscometer into a positioning portion of the temperature control portion that is capable of in-plane movement while lowering the guide pin.

12 Claims, 10 Drawing Sheets

VISCOMETER DEVICE

BACKGROUND

Technical Field

The present invention relates to a viscometer device.

Related Art

As a viscometer device, particularly a rotary viscometer device, a rotor is used in some cases.

As an example, "A cone-plate viscometer comprising: a sample cup; an adjustment ring that detachably supports the sample cup; a viscometer main body that supports the adjustment ring; and a viscometer stand that supports the viscometer main body at an appropriate height, wherein the sample cup is provided with a protrusion formed of an elongated rod body at a center of a lower surface, a recess that is capable of being fitted to the protrusion is formed in the viscometer stand, and the sample cup is held horizontally." has been proposed (see claim 1 of JP 10-160660 A).

SUMMARY

Viscosity measurement by a viscometer device is desirably temperature-controlled so that the sample (measurement target) is not affected by the ambient temperature.

As an example, in the viscometer device, a sample cup is detachably supported by an adjustment ring of the viscometer, and water at a predetermined temperature is circulated in a passage inside the sample cup from a device that circulates water at a predetermined temperature using a rubber hose, thereby setting a liquid temperature of the sample to be constant (see paragraph of the specification of JP 10-160660 A).

However, the viscometer device is inconvenient because it is necessary to connect a device (circulation thermostatic bath) for circulating water or the like to the sample cup using a rubber hose. In addition, the circulation thermostatic bath is large, and thus takes up space. In addition, the temperature control using the circulation thermostatic bath takes time to reach the set temperature.

The present invention is intended to solve at least one of the above problems, and an object thereof is to provide a viscometer device in which temperature control is simple.

One aspect of the present invention that solves at least one of the problems described above is a rotary viscometer device including a rotor and a sample cup, the rotary viscometer device including: a viscometer including the rotor and a closure portion having a larger diameter than the rotor; and a temperature control portion separate from the viscometer, wherein the sample cup is provided at the temperature control portion, and the sample cup is positioned with respect to the closure portion by inserting a vertically movable guide pin of the viscometer into a positioning portion of the temperature control portion that is capable of in-plane movement while lowering the guide pin.

Preferably, in the rotary viscometer device described above, the rotary viscometer device includes a pair of the guide pins and a pair of the positioning portions.

Preferably, in the rotary viscometer device described above, an in-plane position of the positioning portion is adjustable.

Preferably, in the rotary viscometer device described above, the viscometer includes an in-plane restriction portion for restricting an in-plane movement range of the temperature control portion.

Preferably, in the rotary viscometer device described above, the viscometer includes a vertical movement portion for moving a main body up and down, and a lowering restriction portion for restricting a lowering width of the main body.

Preferably, in the rotary viscometer device described above, the temperature control portion includes an urging portion for coming into close contact with a main body of the viscometer.

According to the present invention, it is possible to provide a viscometer device in which temperature control is easy.

Problems, configurations, and effects other than those described above will be clarified by the following description of embodiments.

DETAILED DESCRIPTION

Hereinafter, an example of an embodiment of the present invention will be described with reference to the drawings. Note that constituent elements common to the following embodiments (and modification examples) are denoted by the same reference signs as those that have been already described, and description thereof may be omitted. In addition, in the case of referring to the shape, positional relationship, and the like of the constituent elements and the like, those substantially approximate or similar to the shape and the like are included unless explicitly described otherwise or unless the shape is considered to be obviously not included in principle.

Figure 1:
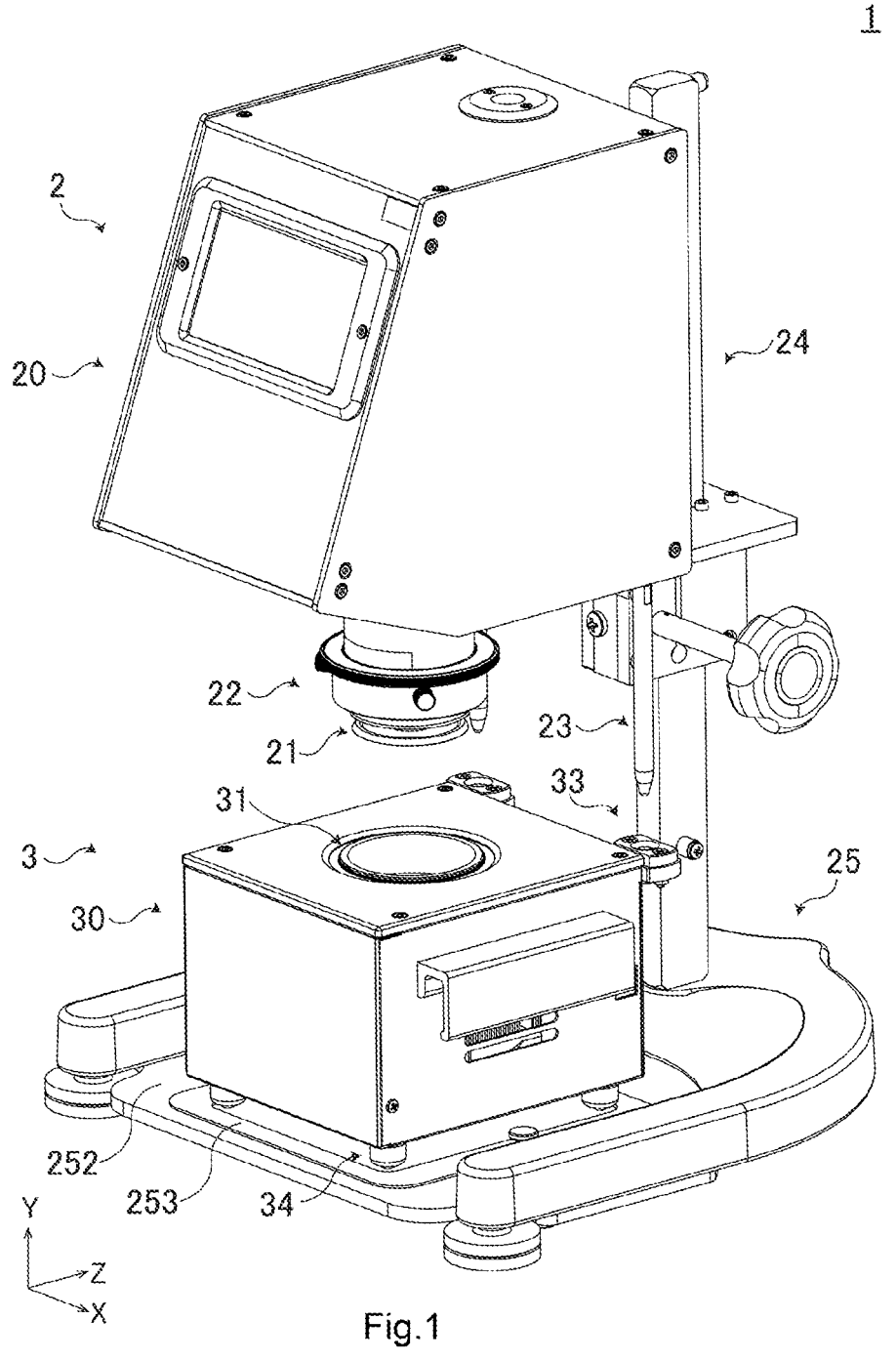
FIG. 1 is a perspective view of an example of a viscometer device according to an embodiment of the present invention.
Figure 2:
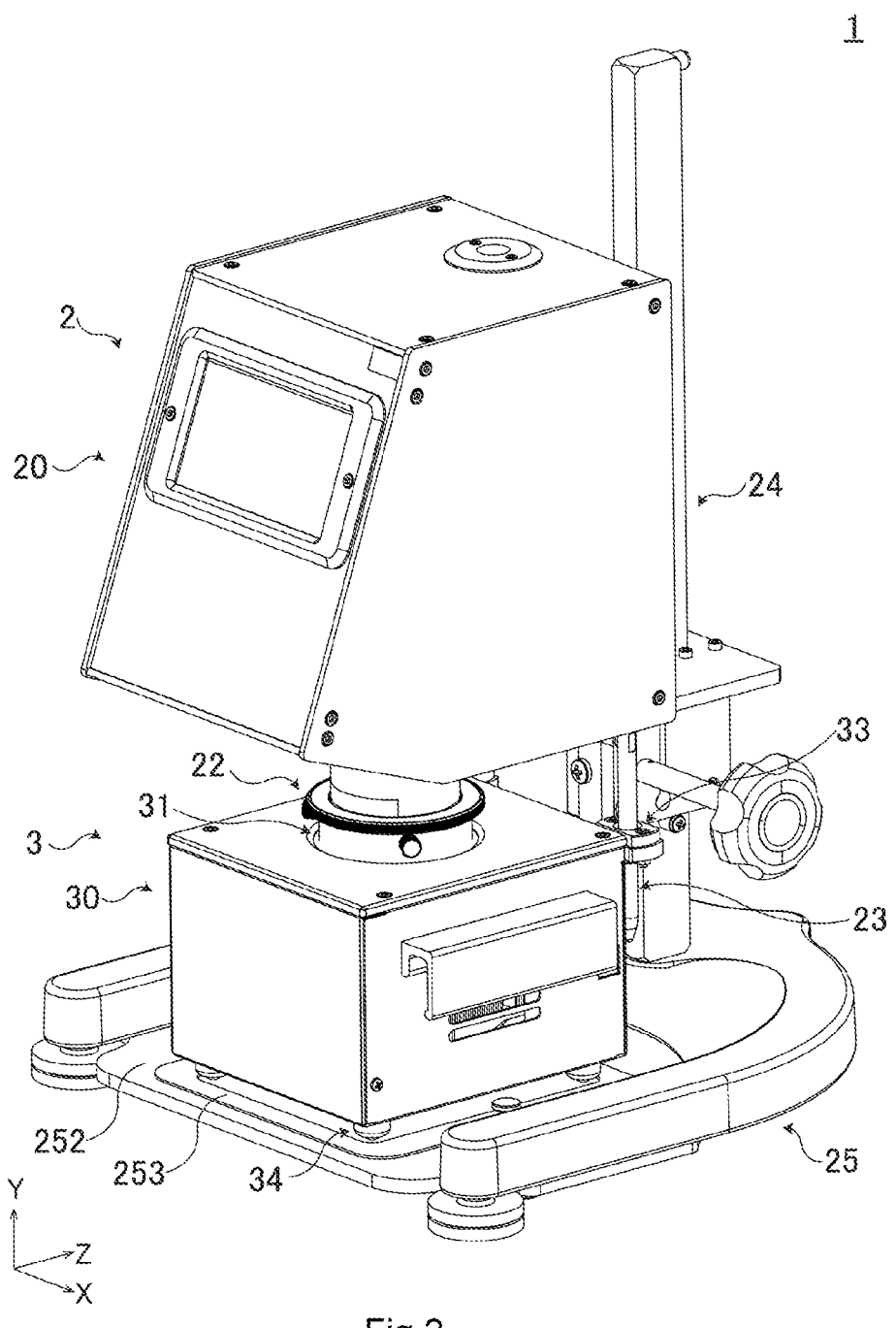
FIG. 2 is a perspective view illustrating an example of a use state of the viscometer device of FIG. 1.

FIG. 1 is a perspective view of an example of a viscometer device according to an embodiment of the present invention, and FIG. 2 is a perspective view illustrating an example of a use state thereof. Hereinafter, the state of the viscometer device in FIG. 1 is referred to as an initial state, and the state of the viscometer device in FIG. 2 is referred to as a closed state. In each drawing, X represents a left-right direction (horizontal direction), Y represents an up-down direction (vertical direction), and Z represents a front-back direction (depth direction) (hereinafter, the same applies to each drawing).

As an example, the viscometer device 1 of the present embodiment is a rotary viscometer device, for example, a type using a rotor and a sample cup. The viscometer device 1 includes a viscometer 2 and a temperature control portion 3 separate from the viscometer 2.

The viscosity measurement by the viscometer device is desirably temperature-controlled so that the sample is not affected by ambient temperature. In a conventional viscometer device using a sample cup, temperature control by a circulation thermostatic bath that circulates water at a predetermined temperature from the circulation thermostatic bath to an internal passage of the sample cup held by the viscometer using a rubber hose is used (see JP 10-160660 A).

Such temperature control by the circulation thermostatic bath is inconvenient, for example, because it is necessary to connect the sample cup using a rubber hose. In addition, the circulation thermostatic bath is large, and thus takes up space. In addition, the temperature control using the circulation thermostatic bath takes time to reach the set temperature. In addition, many circulation thermostatic baths use Freon as a refrigerant, which is not preferable from the viewpoint of environmental protection.

In the viscometer device 1 of the present embodiment, a rotor 21 is provided in the viscometer 2, and a sample cup 31 is integrally provided with the temperature control portion 3. Since the viscometer device 1 includes the temperature control portion 3 having a sample cup shape in which the sample cup 31 is integrated, the temperature can be controlled without using a rubber hose. In addition, as a result of downsizing the temperature control portion 3 to such an extent that the temperature control portion 3 can be placed below a main body 20 of the viscometer 2, an extra space is not required. A temperature control unit incorporated in the temperature control portion 3 is not particularly limited as long as the temperature control unit can be downsized, but, for example, by using a Peltier element, temperature control with a fast response can be performed. Such temperature control is environmentally friendly as it does not require the use of Freon.

On the other hand, there is also a problem in integrating the sample cup 31 with the temperature control portion 3. That is, in a closed viscometer device using a sample cup, the sample cup needs to be closed so as not to be affected by the surroundings. The conventional viscometer device can be easily closed because the sample cup alone is held by a hand and attached to the viscometer. In contrast, in the present embodiment, since the sample cup 31 is integrated with the temperature control portion 3, in order to close the sample cup 31, the viscometer 2 and the temperature control portion 3 need to be aligned in in-plane position.

In order to solve the problem as a premise of the integration, in the viscometer device 1 of the present embodiment, the viscometer 2 includes guide pins 23 that can move up and down as an alignment mechanism, the temperature control portion 3 includes fitting portions 33 corresponding to the guide pins 23 such that the temperature control portion 3 is movable in a plane. As a result, in the viscometer device 1, the in-plane position of the sample cup 31 can be aligned with a closure portion 22 of the viscometer 2 simply by placing the temperature control portion 3 below the closure portion 22 and inserting the guide pins 23 into the fitting portions 33 while lowering the guide pin 23.

With this configuration, the viscometer device 1 can solve the problem for integrating the sample cup 31 with the temperature control portion 3, and can more easily realize the temperature control of the sample cup 31. Hereinafter, an example will be described in detail.

Figure 3:
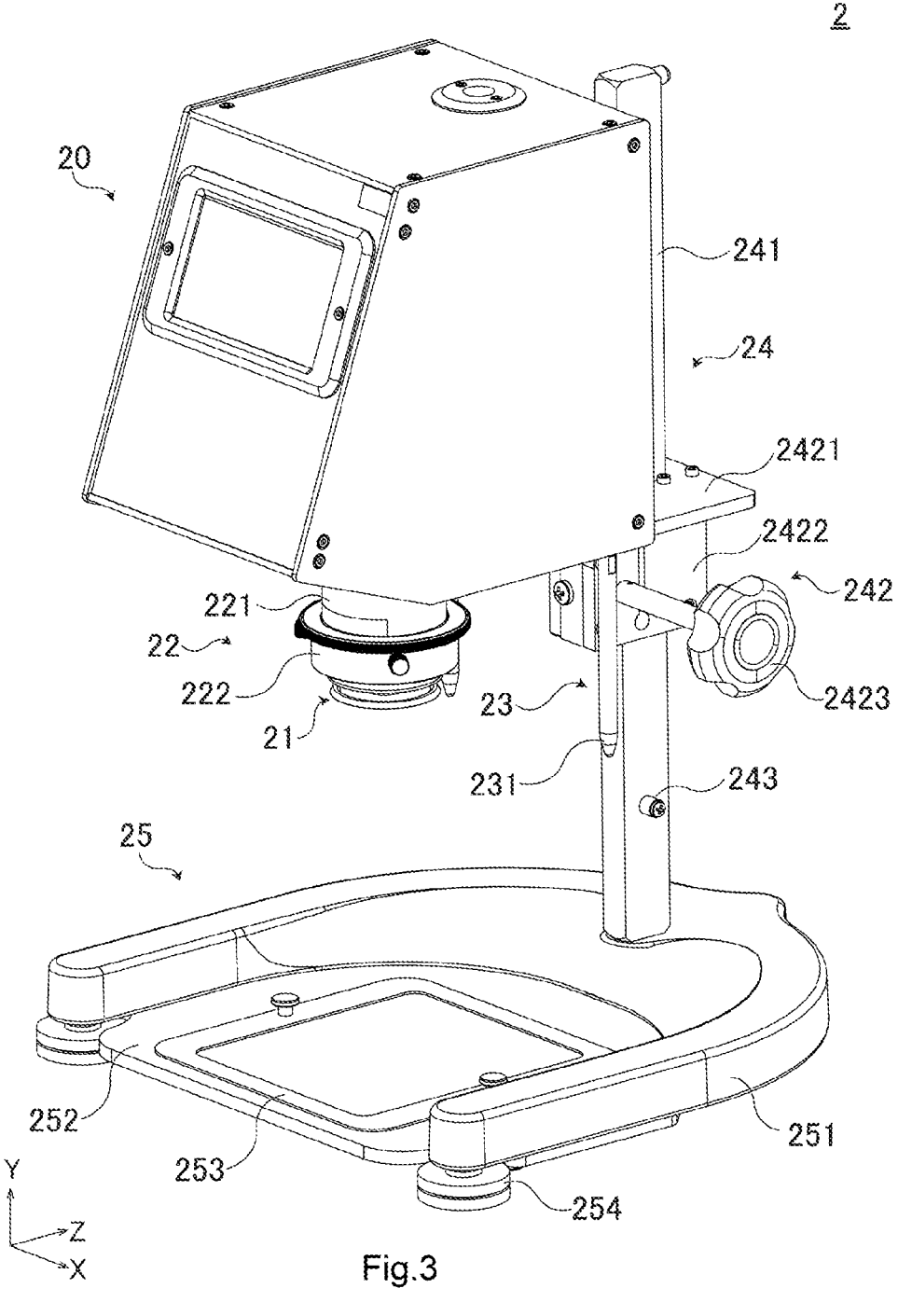
FIG. 3 is a perspective view of the viscometer of FIG. 1.

FIG. 3 is a perspective view of the viscometer of FIG. 1. Here, the viscometer 2 will be described more specifically.

The viscometer 2 includes a main body 20, a support portion 24 that supports the main body 20, and a base portion 25 that supports the support portion 24.

The main body 20 includes a rotor 21, and a closure portion 22 and a pair of guide pins 23 that are disposed so as to protrude downward from a lower end of a frame.

The rotor 21 is, for example, a conical rotor (cone-shaped rotor). The rotor 21 is disposed so as to protrude further downward than the closure portion 22. The rotor 21 is preferably detachably fixed to the rotor shaft. As a viscosity detection mechanism other than the rotor 21 of the main body 20, a conventional technique can be appropriately used, and a detailed description thereof will be omitted here.

The closure portion 22 has a lower end disposed above the rotor 21 and has a larger diameter than the rotor 21. The closure portion 22 is not particularly limited as long as the closure portion 22 can close the sample cup 31. In the use state, the lower end portion of the closure portion 22 comes into contact with a closure receiving portion of the temperature control portion 3 and closes the sample cup 31 so as not to be affected by the surroundings. The closure portion 22 includes, for example, an accommodation portion 221 and a gap adjustment portion 222. Note that a configuration in which the closure portion 22 includes only one of the accommodation portion 221 and the gap adjustment portion 222 may be employed, or the closure portion 22 may have another element instead of this or additionally.

The accommodation portion 221 is a cylindrical member and is a portion that accommodates a rotor shaft and the like. The accommodation portion 221 may be an outer cylinder member that indirectly accommodates the rotor shaft and the like, and a housing that houses the rotor shaft and the like may be accommodated inside the outer cylinder member.

The gap adjustment portion 222 is a portion that adjusts a gap between the rotor 21 and the inner bottom surface of the bottom portion of the sample cup 31. The gap adjustment portion 222 is, for example, a substantially tubular member and has a female thread groove on the inner peripheral surface thereof. The gap adjustment portion 222 is screwed with, for example, a male thread groove provided on the outer peripheral surface of the lower end portion of the accommodation portion 221, and is thus attached to the lower end portion of the accommodation portion 221.

As an example, the pair of guide pins 23 is provided horizontally symmetrically at positions close to left and right ends on the rear end side of the frame of the main body 20. The guide pin 23 is a rod-shaped member having a tapered distal end portion 231, has a circular cross section as an example, and has a proximal end portion fixed to the main body 20 so as to extend vertically. The distal end portion 231 of the guide pin 23 is positioned below the rotor 21. The distal end portion 231 preferably has a shape with a rounded tip.

The support portion 24 is a portion that vertically movably supports the main body 20. As an example, the support portion 24 includes a strut 241, a vertical movement portion 242, and a lowering restriction portion 243.

The strut 241 is, for example, a cornered bar-shaped member having a substantially rectangular cross section.

The lower end of the strut 241 is fixed to the base portion 25 such that the strut 241 extends vertically in the up-down direction.

The vertical movement portion 242 is a portion for integrally moving the main body 20 up and down. As an example, the vertical movement portion 242 includes a mounting plate 2421 extending on a horizontal plane (X-Z plane), a movement portion 2422 provided on a lower end surface of the mounting plate 2421, and a knob portion 2423. The main body 20 is attached to the mounting plate 2421, and when the knob portion 2423 is turned, the main body 20 is moved up and down along the strut 241 by the movement portion 2422. The configuration of the movement portion 2422 is not particularly limited. For example, a configuration in which a roller of the movement portion 2422 may roll on a strut surface of the strut 241, a configuration in which a pinion of the movement portion 2422 engages with a rack attached to the strut 241, or another configuration may be employed. The pair of guide pins 23 can be moved up and down together with the rotor 21 and the closure portion 22 by the vertical movement portion 242.

The lowering restriction portion 243 is a portion that restricts a lowering width of the main body 20. The lowering restriction portion 243 is attached to the strut 241 and defines a lowermost end of lowering of the vertical movement portion 242. As an example, the lowering restriction portion 243 is disposed so as to extend rightward (or leftward) from the right (or left) side surface of the strut 241 and comes into contact with the lower end of the movement portion 2422 to stop lowering (also referred to as a stopper).

As an example, the base portion 25 includes a base frame 251, a placement portion 252, and an in-plane restriction portion 253. The base portion 25 may have a landing portion 254 at the lower end of the base frame 251.

The base frame 251 is, for example, a substantially U-shaped member whose front side is open and whose rear side is closed. The base frame 251 may have landing portions 254 at both end portions and a rear-central portion. The strut 241 is fixed to, for example, a front-central portion of the base frame 251.

The placement portion 252 is a flat plate-shaped member and has a shape or a size corresponding to the inner periphery of the base frame 251. The placement portion 252 is provided so as to cover the inner periphery of the base frame 251 from below as if the placement portion 252 forms the bottom portion thereof. The temperature control portion 3 is preferably placed on the upper surface of the placement portion 252. To be noted, the viscometer 2 does not have to include the placement portion 252, and the temperature control portion 3 may be placed as it is on the surface on which the viscometer 2 is placed in the base frame 251.

The in-plane restriction portion 253 is a portion that restricts an in-plane movement range of the temperature control portion 3. The in-plane restriction portion 253 is, for example, a rectangular frame member having rounded corners. The in-plane restriction portion 253 has a predetermined thickness (height) and is configured such that the temperature control portion 3 cannot pass over the in-plane restriction portion 253 by normal in-plane movement. The in-plane restriction portion 253 is fixed to the placement portion 252 with a fastening member such as a screw or a bolt. When the viscometer 2 does not have the placement portion 252, the in-plane restriction portion 253 does not have to be provided, or may be detachably provided on the placement surface of the viscometer 2.

Figure 4:
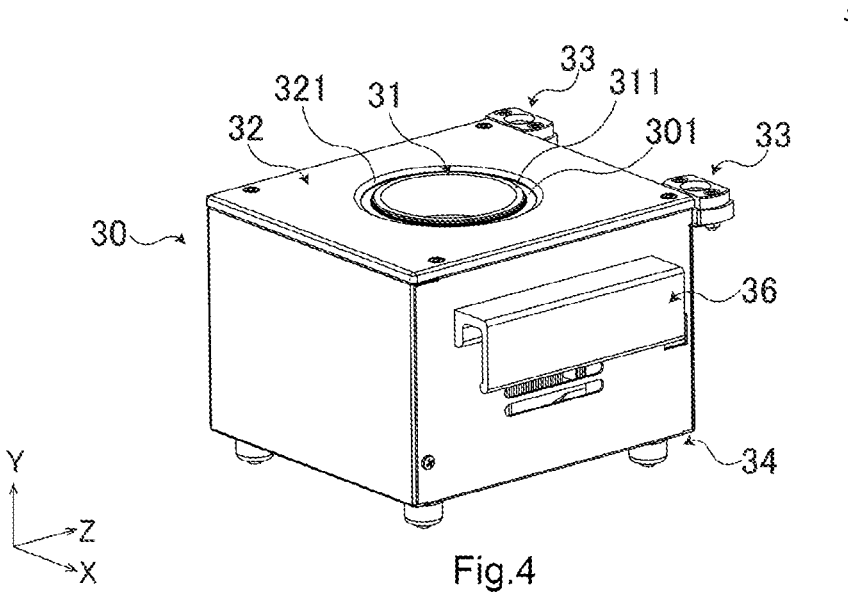
FIG. 4 is a perspective view of a temperature control portion of FIG. 1.
Figure 5:
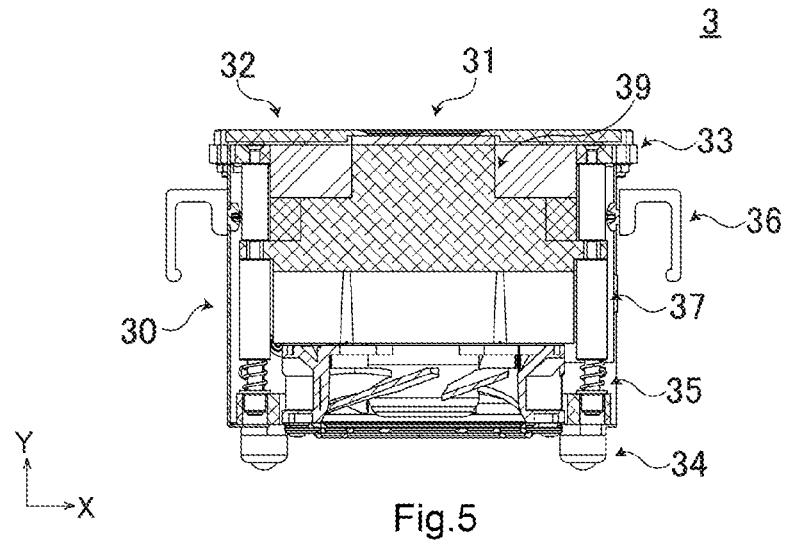
FIG. 5 is a diagram for describing an example of a temperature control portion.

FIG. 4 is a perspective view of a temperature control portion of FIG. 1, and FIG. 5 is a section view of an example thereof. Here, the temperature control portion 3 will be described more specifically. The temperature control portion 3 is configured to have a size small enough to be accommodated in the base frame 251 of the viscometer 2 or the in-plane restriction portion 253.

As an example, the temperature control portion 3 includes a main body 30, the sample cup 31, an upper plate portion 32, a pair of fitting portions 33, an in-plane movement portion 34, an urging portion 35, and a pair of handles 36.

The main body 30 incorporates a temperature control unit 39 in a frame thereof. The temperature control unit 39 is not particularly limited as long as the temperature control unit 39 can be downsized. As an example, the temperature control unit 39 performs temperature control using a Peltier element. In the Peltier element used for temperature control, when a direct current flows, heat moves from one surface to the opposite surface, one surface generates heat to increase the temperature, and the opposite surface absorbs heat to decrease the temperature. In the temperature control using the Peltier element, temperature control of both heating and cooling can be performed by switching the direction and intensity of the flowing current, and the response is quick. The main body 30 further incorporates a control portion, and a fan, a heat sink, or the like for heat dissipation. The main body 30 communicates with a control portion of the main body 20 of the viscometer 2, a computer such as a PC in which control software is installed, or the like in a wired manner (USB or the like) or a wireless manner (infrared light or the like).

The sample cup 31 is a bottomed cylindrical member, and a portion other than an edge portion 311 thereof is buried in the main body 30. As an example, the entire buried portion of the sample cup 31 is temperature-controlled to quickly reach a predetermined temperature. As an example, only the bottom portion of the sample cup 31 may be temperature-controlled. The sample cup 31 is undetachably attached to the main body 30. The sample cup 31 may be detachably attached as long as temperature control and other functions and effects are not hindered.

The upper plate portion 32 is a plate-shaped member that covers the upper surface of the main body 30. The upper plate portion 32 has, at the center thereof, a hole portion 321 having a larger diameter than the outer periphery of the sample cup 31, and the edge portion 311 of the sample cup 31 is exposed through the hole portion 321. Preferably, a portion of an attachment surface of the sample cup 31 around the edge portion 311 is also exposed through the inner periphery of the hole portion 321. The attachment surface portion around the edge portion 311 is lower than both the edge portion 311 and the upper plate portion 32, and a step and an annular bottomed groove portion 301 are formed thereon.

As an example, in the temperature control portion 3, the groove portion 301 abuts the lower end of the closure portion 22 to become a closure receiving portion. As an example, the edge portion 311 of the sample cup 31 may abut the closure portion 22 to become a closure receiving portion. As an example, the upper plate portion 32, more specifically, a peripheral edge portion of the hole portion 321 may abut the closure portion 22 to form a closure receiving portion. In other words, the closure receiving portion of the temperature control portion 3 is constituted by one or more of the groove portion 301, the edge portion 311, and the peripheral edge portion of the hole portion 321.

Preferably, the lower end of the gap adjustment portion 222 of the closure portion 22 abuts the groove portion 301, and the lower end of the accommodation portion 221 abuts the edge portion 311 of the sample cup 31. This facilitates adjustment of the gap between the rotor 21 and the inner bottom surface of the sample cup 31 by the gap adjustment portion 222.

As an example, the pair of fitting portions 33 is provided symmetrically behind the frame of the temperature control portion 3. The configuration of the fitting portions 33 is not particularly limited as long as the guide pins 23 of the viscometer 2 can be inserted therein while being lowered. A specific example of the fitting portions 33 will be described later.

The in-plane movement portion 34 is a portion for integrally planarly moving the temperature control portion 3. The configuration of the in-plane movement portion 34 is not particularly limited as long as the in-plane movement portion 34 is capable of moving two-dimensionally (X and Z directions), in other words, sliding on a horizontal plane. The lower end surface of the temperature control portion 3 may be configured to be slidable, and this lower end surface may constitute the in-plane movement portion 34. The in-plane movement portion 34 may be constituted by a slidable plate or roller attached to the lower end of the temperature control portion 3. The in-plane movement portion 34 is preferably constituted by four ball casters attached to the lower end of the temperature control portion 3 as illustrated in the drawings. The number of the ball casters may be three, five, or more as long as the ball casters can translate on the placement surface.

The urging portion 35 is a portion that brings the temperature control portion 3 into close contact with the main body 20 of the viscometer 2. As illustrated in FIG. 5, the urging portion 35 includes, for example, a plurality of springs that urge the upper surface of the frame of the main body 30 upward. As an example, the temperature control portion 3 includes a plurality of foot portions 37 connecting the upper surface and the lower surface of the frame of the main body 30, the urging portions 35 are incorporated in a portion close to the lower side of the foot portions 37, and the urging portions 35 elastically press the upper surface of the frame upward via the cylindrical portions of the foot portions 37.

Figure 6A:
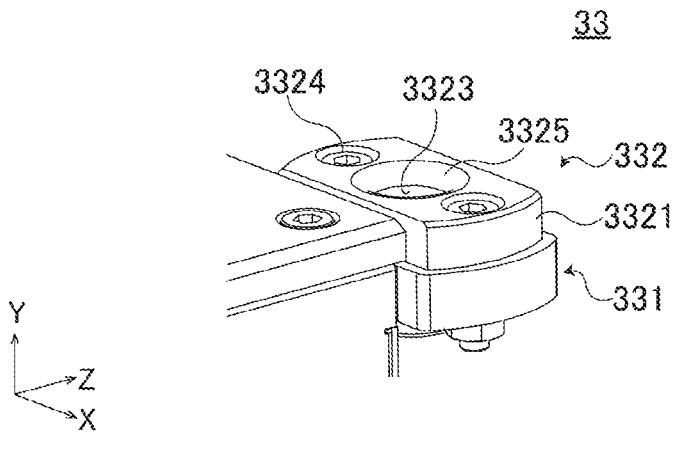
FIGS. 6A and 6B are diagrams for describing an example of a fitting portion.
Figure 6B:
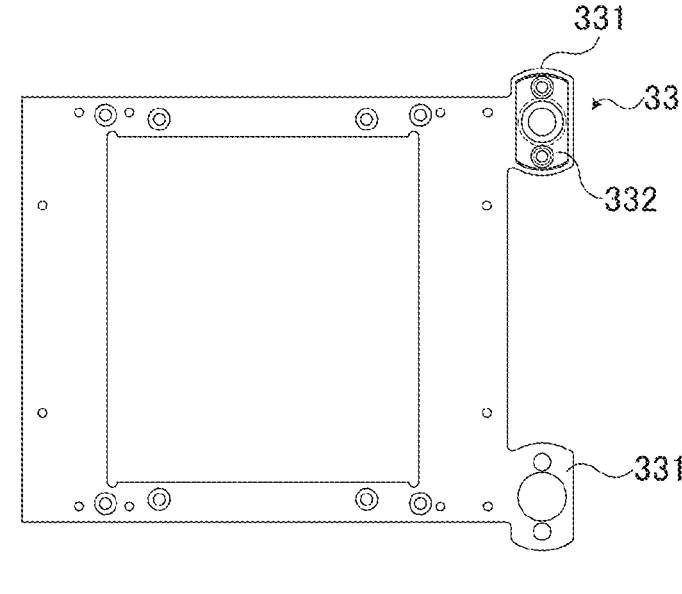

FIGS. 6A and 6B are diagrams for describing an example of a fitting portion, in which FIG. 6A is a partially enlarged view of FIG. 4, and FIG. 6B is an exploded top view of FIG. 4. Here, the fitting portion 33 will be described more specifically. As an example, the fitting portion 33 is configured in a two-step structure, and includes an adjustment portion 331 and a T-shaped bush 332 overlapping the adjustment portion 331. The bush 332 is adjustably fixed to the adjustment portion 331 by a fastening member (for example, a bolt and a nut, a screw, or the like).

As an example, the adjustment portions 331 are provided symmetrically in the left-right direction so as to extend rearward at respective portions near left and right ends of the rear end of the upper surface of the frame of the temperature control portion 3. The adjustment portion 331 may be formed integrally with the upper surface of the frame as illustrated in FIG. 6B, or may be formed separately and attached thereto. For convenience of description, in the description below the adjustment portions 331 are illustrated and described as separate members.

Figures 7A, 7B, 7C:
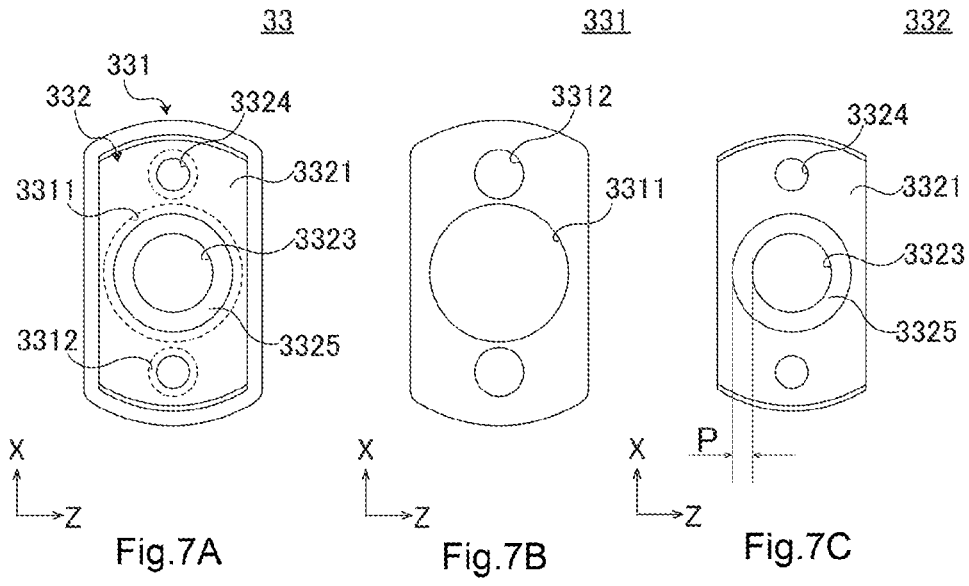
FIGS. 7A to 7E are diagrams for describing an example of a fitting portion.
Figures 7D, 7E:
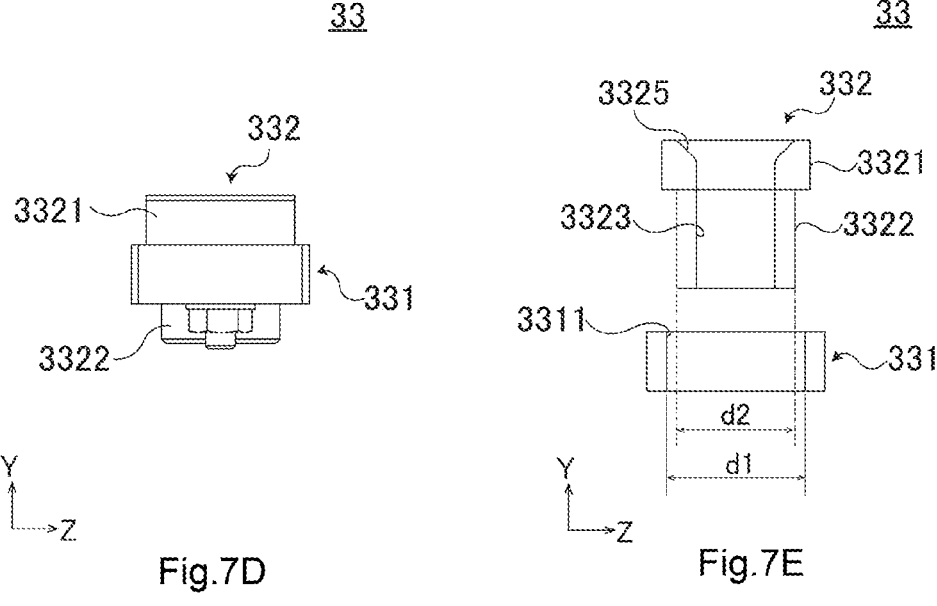

FIGS. 7A to 7E are diagrams for describing an example of a fitting portion, in which FIG. 7A illustrates the entirety of the fitting portion as viewed from above, FIG. 7B illustrates the adjustment portion as viewed from above, FIG. 7C illustrates the bush as viewed from above, FIG. 7D illustrates the entirety of the fitting portion as viewed from the side, and FIG. 7E illustrates a longitudinal section view (Y-Z section view) in a disassembled state.

The adjustment portion 331 has a flat plate shape and has a hole portion 3311 through which the bush 332 is inserted, and a pair of hole portions 3312 for fastening the bush 332. Each of the hole portion 3311 and the hole portions 3312 is a through hole, and has an inner diameter larger than that of a corresponding portion of the bush 332, so that the in-plane position (in the X and Z directions) of the bush 332 can be adjusted.

The bush 332 includes a connecting portion 3321 having a flat plate shape, a cylindrical portion 3322 vertically protruding downward from the connecting portion 3321, and a positioning portion 3323 penetrating the connecting portion 3321 and the cylindrical portion 3322. In the bush 332, the cylindrical portion 3322 is inserted into the hole portion 3311 of the adjustment portion 331, and the connecting portion 3321 remains on the upper surface of the adjustment portion 331 and overlaps as an upper layer.

The connecting portion 3321 has, on opposing sides of the positioning portion 3323, a pair of hole portions 3324 for being fastened to the adjustment portion 331. The hole portion 3324 is a through hole, and has an inner diameter smaller than the inner diameter of the hole portion 3312 of the adjustment portion 331. The hole portion 3324 is preferably a counterbore from which the head of a bolt or a screw does not protrude.

As illustrated in FIG. 7E, the outer diameter (d2) of the cylindrical portion 3322 is smaller than the inner diameter (d1) of the hole portion 3311 of the adjustment portion 331. With such a configuration, the position of the cylindrical portion 3322 is adjusted within the inner diameter d1 of the hole portion 3311, whereby the in-plane position (in the X and Z directions) of the positioning portion 3323 can be adjusted.

The positioning portion 3323 is provided for positioning the temperature control portion 3 in the X and Z directions with respect to the main body 20 of the viscometer 2. As an example, the positioning portion 3323 has a circular cross section similarly to the guide pins 23. The diameter of the positioning portion 3323 is substantially equal to the diameter of the main body (portion excluding the distal end portion 231) of the guide pin 23, and the centers thereof substantially coincide with each other in a state where the guide pin 23 is inserted.

In the positioning portion 3323, a guide surface 3325 serving as an inlet is an inclined surface (tapered in section view). As illustrated in FIG. 7C, the guide surface 3325 is an annular inclined surface having a difference between the upper end radius and the lower end radius as a width P. The height of the guide surface 3325 is, for example, about ⅓ to about the same as the height of the connecting portion 3321. The guide surface 3325 preferably has rounded corner portions at the upper end and the lower end thereof so that the guide pin 23 can be easily inserted therein.

<Introduction of Temperature Control Portion (Alignment of In-Plane Positions)>

In the viscometer device 1, the temperature control portion 3 is slid and introduced to a fixed position by inserting the guide pins 23 mounted on the viscometer 2 into the positioning portions 3323 of the fitting portions 33. In other words, the sample cup 31 is positioned with respect to the closure portion 22 by inserting the guide pins 23 capable of vertical movement into the positioning portions 3323 of the temperature control portion 3 capable of in-plane movement while the guide pins 23 are lowered.

Figure 8:
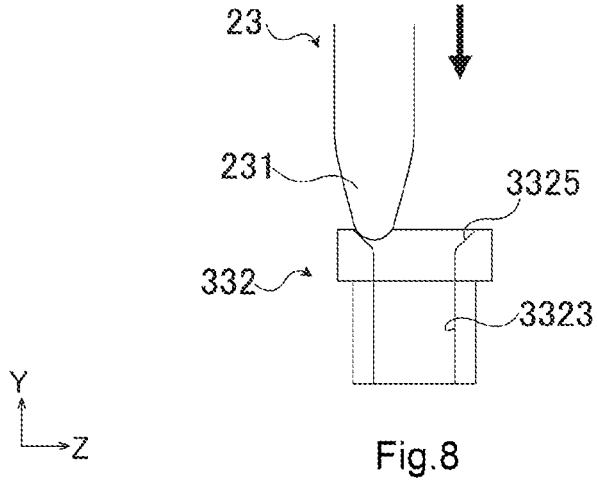
FIG. 8 is a diagram for describing an example of a guide pin and a fitting portion.

FIG. 8 is a diagram for describing an example of the guide pin and the fitting portion.

When using the viscometer device 1, the temperature control portion 3 is placed below the main body 20 of the viscometer 2 by the measurer, but it is not easy to place the fitting portions 33 at fixed positions directly below the guide pins 23 (match the in-plane positions) by visual measurement.

The guide surface 3325 of the fitting portion 33 is provided for facilitating this alignment. As illustrated in the drawing, when the distal end portion 231 of the descending guide pin 23 is brought into contact with the guide surface 3325, the guide pin 23 can slide downward along the guide surface 3325 while drawing the temperature control portion 3 to the fixed position, and therefore, even if the position confirmed by visual measurement deviates from the fixed position, the temperature control portion 3 can be introduced to the fixed position.

Figure 9:
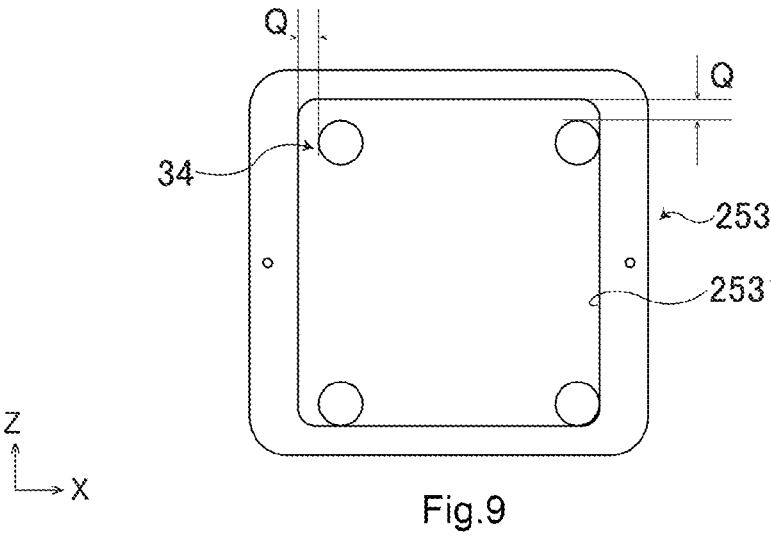
FIG. 9 is a diagram for describing an example of an in-plane restriction portion and an in-plane movement portion.

FIG. 9 is a diagram for describing an example of the in-plane restriction portion and the in-plane movement portion.

In order to introduce the temperature control portion 3 to the fixed position, it is desirable that the temperature control portion 3 is easily slidable. Meanwhile, in a state in which the guide pins 23 are not inserted, the temperature control portion 3 is easily movable, so that the guide pins 23 may not be inserted into the fitting portions 33.

The in-plane restriction portion 253 restricts the in-plane movement range of the temperature control portion 3 to facilitate the introduction. As illustrated in the drawing, preferably, an inner periphery 2531 of the in-plane restriction portion 253 is wider than the in-plane movement portion 34 by a width Q in both the width direction and the depth direction. The width Q is set in correspondence with the guide surface 3325, and is set in a range in which the guide pin 23 can contact the guide surface 3325.

In the viscometer device 1, when the temperature control portion 3 is placed within the inner periphery 2531 of the in-plane restriction portion 253, the descending guide pins 23 always pass through the fitting portions 33, and the temperature control portion 3 can be always introduced to the fixed position.

It is conceivable that the viscometer device 1 may be displaced, deformed, or the like after being used for some period, but since the positions of the positioning portions 3323 in the fitting portions 33 can be adjusted, such a case can also be handled.

Figure 10:
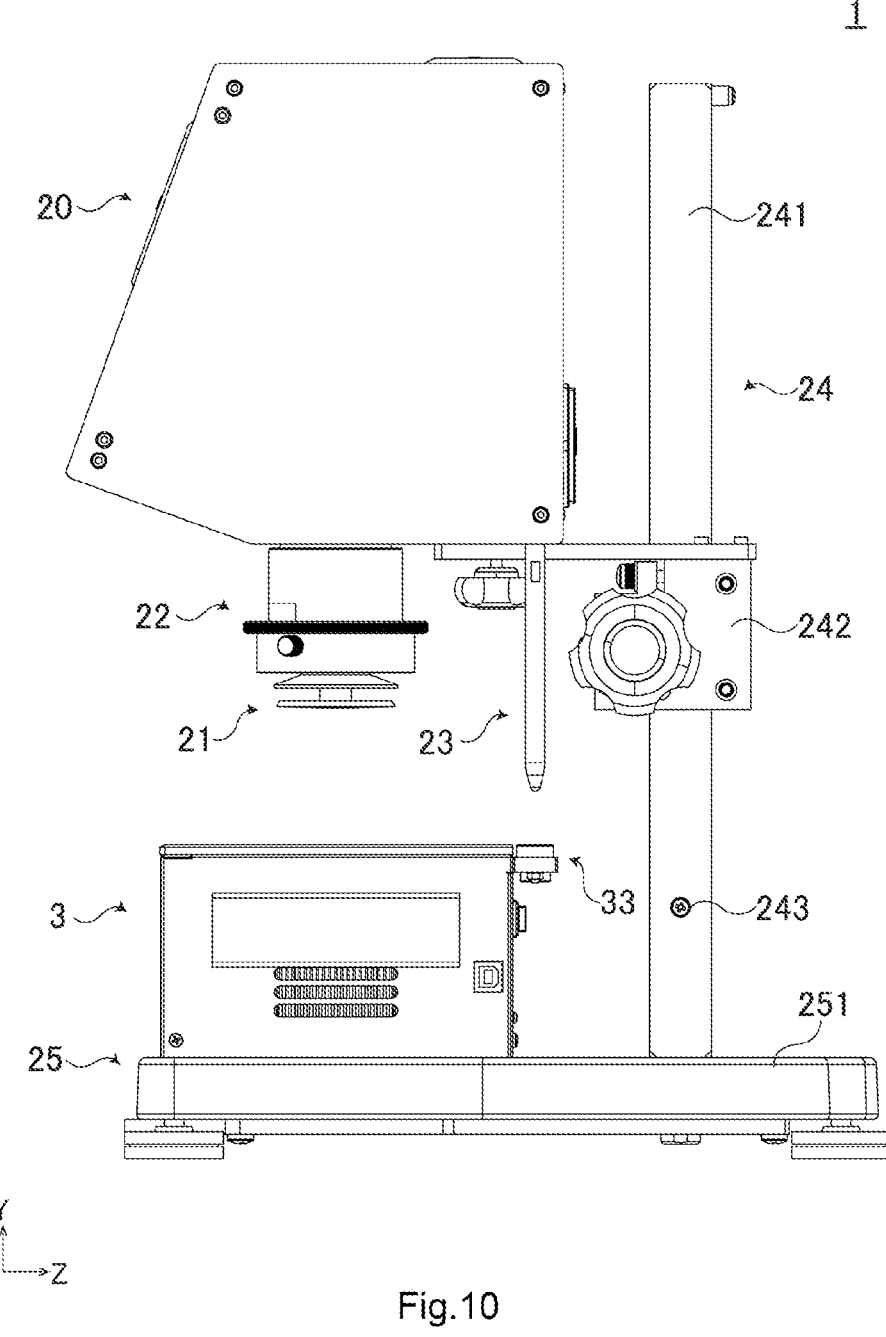
FIG. 10 is a diagram for describing an example of operation of the viscometer device of FIG. 1.
Figure 11:
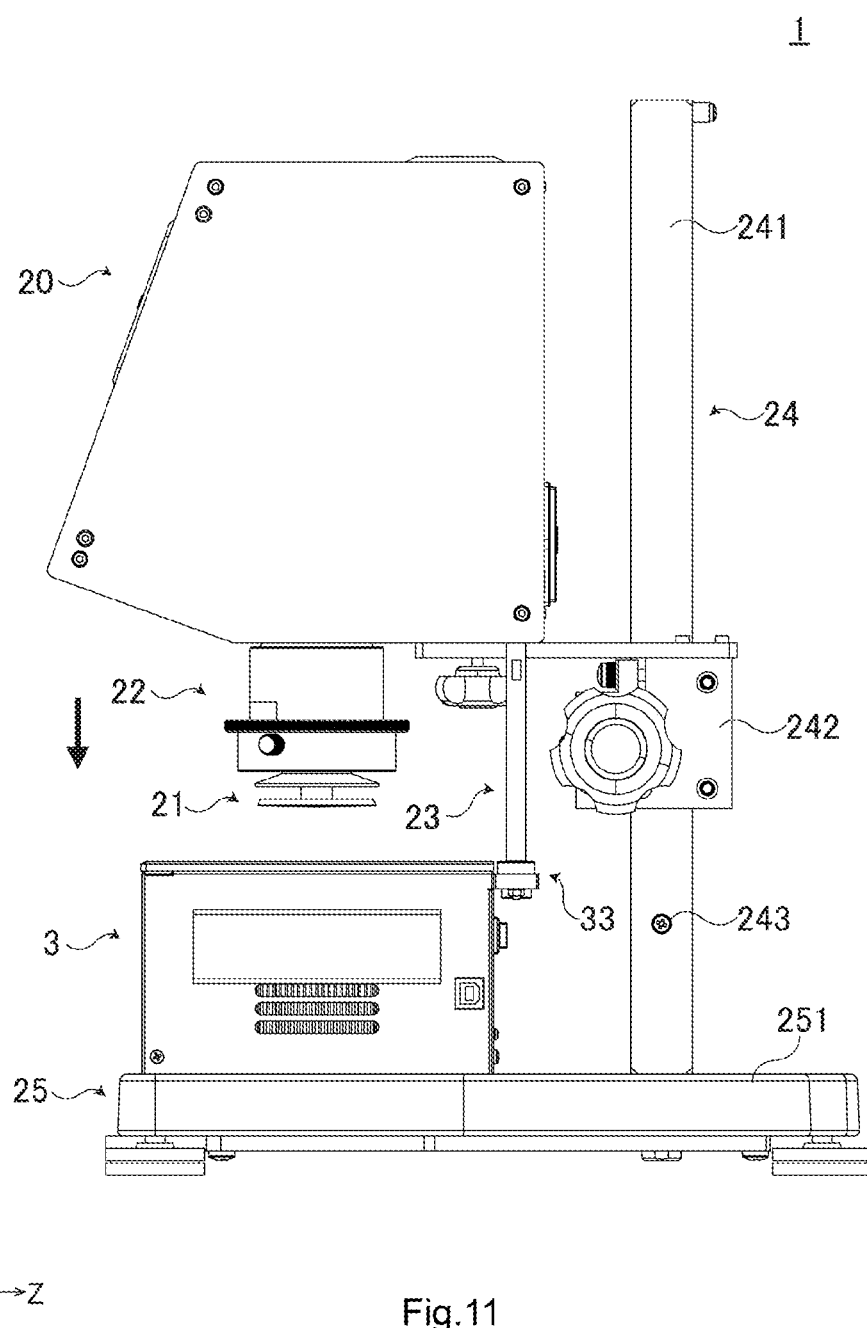
FIG. 11 is a diagram for describing an example of operation of the viscometer device of FIG. 1.
Figure 12:
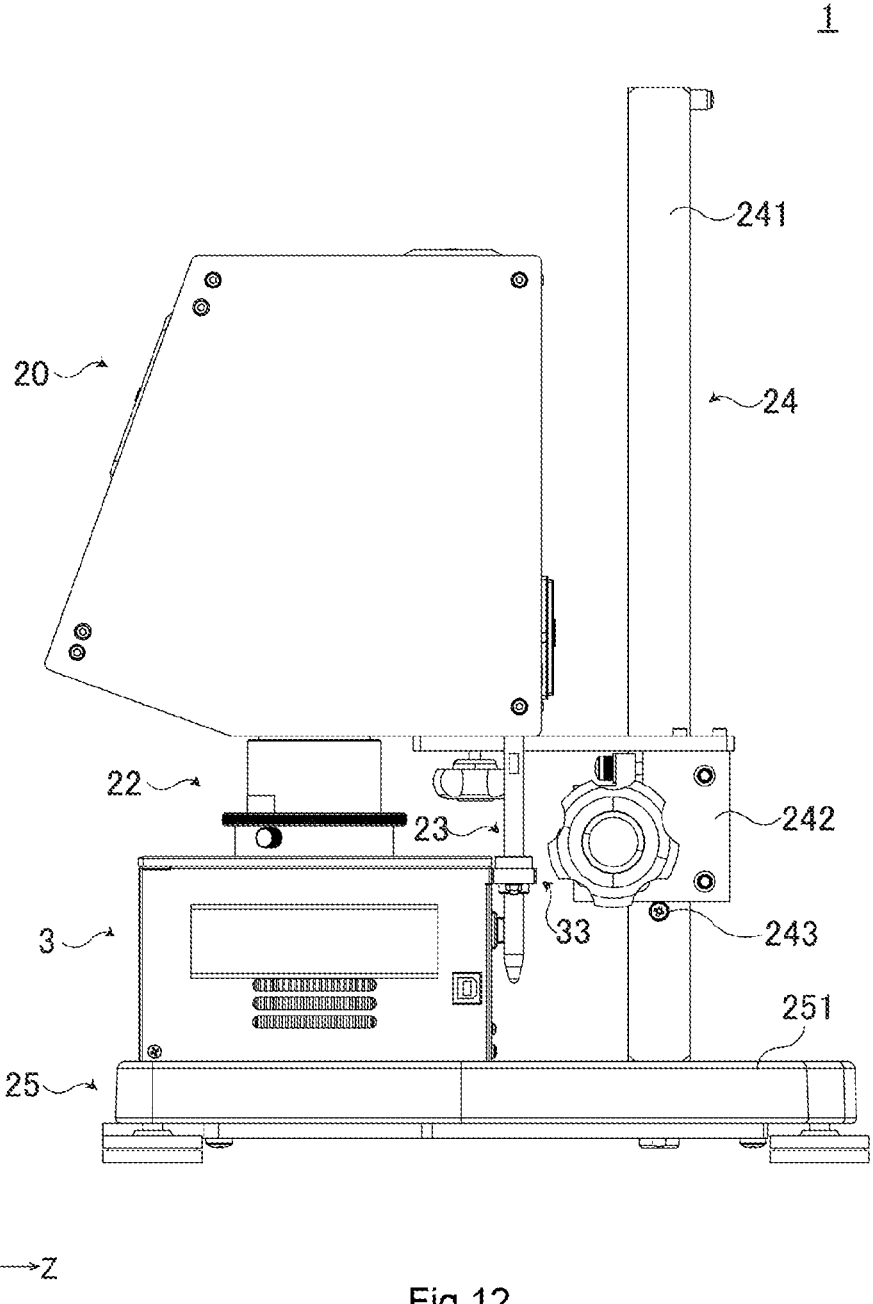
FIG. 12 is a diagram for describing an example of operation of the viscometer device of FIG. 1.

FIGS. 10 to 12 are diagrams for describing an example of the operation of the viscometer device of FIG. 1.

As illustrated in FIG. 10, when the viscometer device 1 is used, first, the temperature control portion 3 is placed within the base frame 251 of the base portion 25, more specifically, within the in-plane restriction portion 253 on the placement portion 252.

As illustrated in FIG. 11, when the guide pins 23 are lowered together with the rotor 21 and the closure portion 22 by the vertical movement portion 242 of the viscometer 2, the temperature control portion 3 is introduced into the fixed position while the guide pins 23 are inserted in the fitting portions 33.

As illustrated in FIG. 12, the closure portion 22 comes into contact with the closure receiving portion of the temperature control portion 3 and closes the sample cup 31 so as not to be affected by the surroundings.

<Close Contact Between Temperature Control Portion and Viscometer>

Since the closeness of contact between the viscometer and the sample cup affects the measured viscosity value, it is desirable that the sample cup and the viscometer are brought into close contact with each other in the same state every time.

As illustrated in FIG. 12, the viscometer device 1 can keep the lowering width constant by lowering the viscometer 2 to the lowering restriction portion 243. In addition, since the temperature control portion 3 includes the urging portions 35, and the urging portions 35 push back the main body 20 of the viscometer 2, the main body 20 of the viscometer 2 and the closure receiving portion of the temperature control portion 3 can be brought into close contact with each other. As a result, in the viscometer device 1, the sinking amount of the rotor 21 is always constant, and the closure portion 22 and the closure receiving portion are always in close contact with each other with the same force.

Although the rotary viscometer device having the rotor and the sample cup has been described above as an example, the present invention may be applied to other viscometer devices. The present invention may be configured as a viscometer device including only a part of the above configuration.

Although examples of the embodiment of the present invention have been described above, these are merely examples of the present invention, and the present invention is not limited thereto. The present invention includes a form in which the above-described embodiments and modifications thereof are combined, and further includes various modifications. Various additions, modifications, and partial deletions can be made without departing from the conceptual idea and spirit of the present invention derived from the contents defined in the claims and equivalents thereof.

What is claimed is:

1. A rotary viscometer device including a rotor and a sample cup, the rotary viscometer device comprising:

a viscometer that includes the rotor, a closure portion having a larger diameter than the rotor, and a guide pin extending in a vertical direction wherein a distance between the closure portion and the guide pin is fixed, and the closure portion and the guide pin are configured to move together only in the vertical direction; and a temperature control portion that is separate from the viscometer and has an in-plane movement portion to regulate an in-plane movement of the temperature control portion so that the temperature control portion is allowed to move only in a width direction and a depth direction both of which are perpendicular to the vertical direction, not moving in the vertical direction, a positioning portion that is in a hollow shape with an inner periphery matching an outer periphery of the guide pin, and a guide surface that is provided above the positioning portion in the vertical direction, and is an inclined surface of which an inner periphery expands toward the temperature control portion so that the guide surface has an opening at an upper edge that is larger than the inner periphery of the positioning portion, wherein the sample cup is provided at the temperature control portion wherein a distance between the sample cup and the positioning portion is fixed, and the sample cup and the positioning portion are configured to move together only in the width direction and the depth direction, the sample cup is positioned with respect to the closure portion by inserting the guide pin of the viscometer into the positioning portion of the temperature control portion through the opening of the guide surface while lowering the guide pin, and the viscometer includes an in-plane restriction portion that has an inner periphery within which the in-plane movement of the temperature control portion is allowed to move, wherein the inner periphery is wider than the in-plane movement portion in both the width direction and the depth direction, and a width and a depth of the inner periphery of the in-plane restriction portion are configured such that a tip of the guide pin is always placed within the opening of the guide surface in a view from the vertical direction.

2. The rotary viscometer device according to claim 1, wherein the rotary viscometer device includes another guide pin that is identical to the guide pin, wherein two of the guide pins are arranged separately in the width direction, and another positioning portion that is identical to the positioning portion, wherein two of the positioning portion are arranged corresponding to the guide pins.

3. The rotary viscometer device according to claim 1, wherein an in-plane position of the positioning portion is adjustable.

4. The rotary viscometer device according to claim 1, wherein the viscometer includes a vertical movement portion for moving a main body up and down, and a lowering restriction portion for restricting a lowering width of the main body.

5. The rotary viscometer device according to claim 1, wherein the temperature control portion includes an urging portion for coming into close contact with a main body of the viscometer.

6. The rotary viscometer device according to claim 1, wherein the guide pin has a tip in a conical shape, and the tip being positioned on an axis of the conical shape, the opening of the guide surface has a circular shape with an inner diameter, the inner periphery of the in-plane restriction portion is wider than the in-plane movement portion by width Q in both the width direction and the depth direction, and width Q is smaller than the inner diameter of the opening of the guide surface.

7. A rotary viscometer device including a rotor and a sample cup, the rotary viscometer device comprising:

a viscometer that includes the rotor, a closure portion having a larger diameter than the rotor; and a guide pin extending in a vertical direction wherein a distance between the closure portion and the guide pin is fixed, and the closure portion and the guide pin are configured to move together only in the vertical direction; and a temperature control portion that is separate from the viscometer and has an in-plane movement portion to regulate an in-plane movement of the temperature control portion so that the temperature control portion is allowed to move only in a width direction and a depth direction both of which are perpendicular to the vertical direction, not moving in the vertical direction, a positioning portion that is in a hollow shape with an inner periphery matching an outer periphery of the guide pin, and a guide surface that is provided above the positioning portion in the vertical direction, and is an inclined surface of which an inner periphery expands toward the temperature control portion so that the guide surface has an opening at an upper edge that is larger than the inner periphery of the positioning portion, wherein the sample cup is provided at the temperature control portion wherein a distance between the sample cup and the positioning portion is fixed, and the sample cup and the positioning portion are configured to move together only in the width direction and the depth direction, the sample cup is positioned with respect to the closure portion by inserting the guide pin of the viscometer into the positioning portion of the temperature control portion through the opening of the guide surface while lowering the guide pin, and the viscometer includes an in-plane restriction portion that has an inner periphery within which the in-plane movement of the temperature control portion is allowed to move, wherein the in-plane restriction portion on the viscometer has a height that the temperature control portion cannot pass over during the in-plane movement and has no openings to the outside except at the top such that a tip of the guide pin is always placed within the opening of the guide surface in a view from the vertical direction.

8. The rotary viscometer device according to claim 7, wherein the rotary viscometer device includes another guide pin that is identical to the guide pin, wherein two of the guide pins are arranged separately in the width direction, and another positioning portion that is identical to the positioning portion, wherein two of the positioning portion are arranged corresponding to the guide pins.

9. The rotary viscometer device according to claim 7, wherein an in-plane position of the positioning portion is adjustable.

10. The rotary viscometer device according to claim 7, wherein the viscometer includes a vertical movement portion for moving a main body up and down, and a lowering restriction portion for restricting a lowering width of the main body.

11. The rotary viscometer device according to claim 7, wherein the temperature control portion includes an urging portion for coming into close contact with a main body of the viscometer.

12. The rotary viscometer device according to claim 7, wherein the guide pin has a tip in a conical shape, and the tip being positioned on an axis of the conical shape, the opening of the guide surface has a circular shape with an inner diameter, the inner periphery of the in-plane restriction portion is wider than the in-plane movement portion by width Q in both the width direction and the depth direction, and width Q is smaller than the inner diameter of the opening of the guide surface.

* * * * *